United States Patent [19]
De Marco et al.

[11] Patent Number: 5,133,290
[45] Date of Patent: * Jul. 28, 1992

[54] TRANSPORTATION CONTAINER FOR LABORATORY ANIMALS

[76] Inventors: Peter F. De Marco; Cynthia D. De Marco, both of 1297 Palmer House Ct., Columbus, Ohio 43235

[*] Notice: The portion of the term of this patent subsequent to Jul. 16, 2008 has been disclaimed.

[21] Appl. No.: 592,339

[22] Filed: Oct. 3, 1990

Related U.S. Application Data

[63] Continuation-in-part of Ser. No. 482,906, Feb. 20, 1990, Pat. No. 5,031,573.

[51] Int. Cl.[5] .............................................. A01K 1/03
[52] U.S. Cl. .................................... 119/15; 206/407
[58] Field of Search ................. 119/15; 206/407, 429, 206/430, 446, 485, 596

[56] References Cited

U.S. PATENT DOCUMENTS

| | | | |
|---|---|---|---|
| 2,962,187 | 11/1960 | Morris | 206/407 X |
| 3,327,845 | 6/1967 | Hasselhoff | 206/430 |
| 3,899,100 | 8/1975 | Rigaud | 206/407 X |
| 4,643,302 | 2/1987 | Baumgardner | 206/315.11 X |
| 4,785,764 | 11/1988 | Müller | 119/15 |
| 5,031,573 | 7/1991 | De Marco et al. | 119/15 |

*Primary Examiner*—Robert P. Swiatek
*Attorney, Agent, or Firm*—Frank H. Foster

[57] ABSTRACT

A container made up of a smooth, seamless, synthetic resin tube with air permeable end caps which removably fasten to each end, used for transporting animals. A holder made of corrugated paper with aligned holes on opposite panels through which the containers are inserted and held.

30 Claims, 6 Drawing Sheets

TRANSPORTATION CONTAINER FOR LABORATORY ANIMALS

This application is a continuation-in-part of our co-pending application Ser. No. 07/482,906, filed Feb. 22, 1990, now U.S. Pat. No. 5,031,573.

TECHNICAL FIELD

This invention relates to the field of animal transport containers and apparatus for holding such containers.

BACKGROUND ART

Animal transport containers are used to transport live animals from one location to another. During this transit the animal should maintain its health and fitness. For this to occur the container must meet a number of criteria.

The animals require such items as bedding, food, water and air to survive. The people responsible for transportation prefer that the container be inexpensive to assemble or purchase, easily cleaned if reusable, and safe for those people loading and unloading the animals.

The economics of the container are determined by the initial cost and the number of reuses of the container. To be reused the container must be effectively made sanitary.

The container must additionally hinder the escape of the animal by preventing gnawing or clawing on the mechanisms of the container or the container itself.

U.S. Pat. No. 922,993 shows some of the characteristics described above. This patent discloses a very large, cylindrical, steel tube for transporting human convicts. It has an axle which passes through the tube with attached wheels on either side of the tube. At the rear it has an exit door and at the front it has an air inlet, an awning and a hitch. The container, though not described for animals, demonstrates some inherent problems. The presence of a through axle provides a possible point of engagement for escape by the convicts or animals. The front of the container does not allow entry or exit which limits usefulness and cleaning access. Furthermore, the location of the locking device on the door allows the contained convicts or animals direct access at the locking mechanism. The complexity and therefore the expense of manufacture of the convict cage is increased by the addition of an attached mobility system, consisting of wheels and a hitch. Cleaning of the container is also very restricted because of the presence of beds and an internal door.

U.S. Pat. No. 2,522,391 discloses a carrier for small animals. This device shows a door located on the side which allows access by the contained animal to the door. It provides a point at which the animal can gnaw or insert its claws. The complexity of the system is further increased by the addition of a handle, small bumpers and latches. These add to the difficulty with which the container is cleaned and further increase the initial expense of the container.

U.S. Pat. No. 3,272,376 shows an insect container. The container disclosed uses a fine, flexible mesh wire tube embedded in a hardened plaster material at one end with a removable cap at the other. This system, though described for insects, would have many disadvantages if used to contain animals. Primarily, the animal could easily escape since the lid contains no securing device, other than a frictional engagement of the lid with the wire mesh. Additionally, the plaster-like material on the bottom of the container would greatly inhibit sanitation of the container since it is porous and, as such, would absorb most liquids. The weight of the plaster material at the one end is additionally a non-necessity for animal transport and a hindrance for economical transport.

In U.S. Pat. No. 4,212,267, Patterson shows an insect container having a cylindrical glass tube standing upright with a feed cup at the bottom and a cap at the top. Since Patterson is another insect containing device, it would be very difficult to adapt to contain laboratory animals which, in general, are much larger and stronger than insects. Most animals, such as mice or rats, would easily destroy the cotton wad inserted in the top cap, and could most likely slide the frictionally engaged cap or food cup off allowing escape.

Thrower, in U.S. Pat. No. 903,918, shows a cylindrical vegetable container with perforated side walls. As before, the use of a container not intended for animals is undesirable because of the special needs which a living animal has, such as the need to breath and excrete waste, needs which are much different than those which vegetables have. Thrower would allow any waste to exit the container, and would additionally allow for an animal to lodge an appendage in the holes of the sidewalls.

Most conventional animal transport containers are one of the following three types. Cardboard boxes with perforations at various locations, plastic or wood boxes with handles and screened ventilation ports at various locations, or wire mesh cages with an access on one or more sides.

The cardboard container, while cardboard is inexpensive, is very unsanitary since it absorbs liquids and is not reusable. Additionally, it is not very strong for transporting large animals. The plastic or wood container is expensive to manufacture and difficult to effectively clean. The wire mesh container is somewhat expensive to manufacture and rusts after a number of uses, providing surfaces for bacterial growth. These cages could scratch or cut the handler. All three types are very dangerous for the person responsible for removing the animal from it. The danger arises when the handling person is forced to reach into the container to get the animal. The animal can grab hold of the wire mesh or some other engagable surface and not let go, or when the person has his hand inside the container, the animal can bite him.

The need arises, therefore, for an animal transport container which is inexpensive to assemble, is easily and effectively cleaned, can be closed to prevent animal escape, and which provides ease and safety in removal of the animal.

BRIEF DISCLOSURE OF INVENTION

This invention is an animal transport container. The container comprises a smooth, seamless, fluid impervious, tube. The container further comprises a removably fastened, air permeable end cap at each end of the tube which is indestructible by the contained animal. The container provides safe and economical transport of animals. A container holder can be combined with the container, the holder comprising at least two opposed panels. At least one aligned hole pair is formed into these panels into which the container may be inserted and frictionally engaged by the panels.

Figure 1:
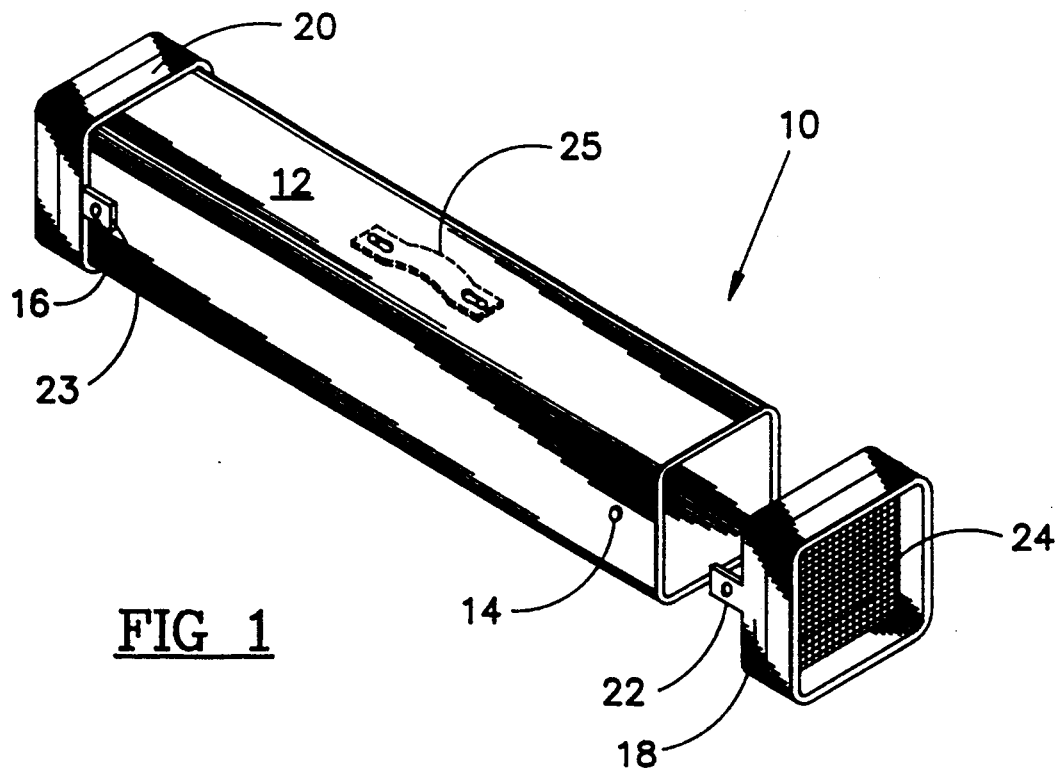
FIG. 1 is an exploded view in perspective illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

The preferred embodiment of the present invention, illustrated in FIG. 1, is a container 10 made up of a tube 12, having an interior surface which is smooth and generally seamless, and having buttons 14 and 16 formed on the exterior surface of the tube 12 at opposite ends of the tube 12. Each of the buttons 14 and 16 has a duplicate partner button formed on the back side of the tube 12, neither of which is visible in FIG. 1. At opposite ends of the tube 12, there are end caps 18 and 20 which are identical to each other in the preferred embodiment. Each of the end caps 18 and 20 has a pair of straps 22 and 23. One strap is formed on the front side of the end caps 18 and 20 and is visible in FIG. 1, and another identical strap is formed on the back side of the end caps 18 and 20 and is not visible in FIG. 1. The end cap 18 has a mesh screen 24 which is rigidly mounted to the end cap 18 and spans across the inside of the end cap 18, approximately mid-way between the two ends of the end cap 18, not including the straps of the end cap. The end cap 20 has an identical mesh screen which is not visible in FIG. 1. The mesh screen 24, in the preferred embodiment, is a rigid wire lattice which permits air flow through the container 10. The mesh screen 24 is durable enough that a contained animal not only cannot tear, gnaw or scratch pieces out of it, but also a contained animal cannot break completely through it, allowing the animal to escape from the container 10. Because the mesh screen 24 cannot be damaged by the contained animal, the mesh screen 24 can be described as indestructible (not able to be destroyed) by the contained animal. If the contained animal could tear pieces out of the mesh screen 24, it could consume them or other portions of the container which would unbalance the highly controlled physical condition of the animal.

The shape of the preferred container 10 is generally square in cross-section, having rounded corners to aid in cleaning of the tube 12. It is within the scope of this invention, however, to use a circular cross-section tube or a triangular or other polygonal shaped cross-section tube and end caps to produce a similar container.

A handle 25, shown in phantom in FIG. 1 may be attached to the outer surface of the tube 12 to facilitate handling of the container 10 and also may be removed from the tube 12 to allow for complete cleaning of the tube 12.

The container 10 is assembled as follows. The end cap 18 is separate from the tube 12 and the opposite end cap 20 is secured as shown in FIG. 1. A specimen is placed inside of the tube 12 and the end cap 18 is aligned with the tube 12 and the end cap 18 is slid over the tube 12. That is, the outer surface of the tube 12 slidably engages with the inner surface of the end cap 18. As the end cap 18 approaches its farthest extreme engagement onto the tube 12, the straps 22 are bent outward from the tube 12 and over the button 14, and its partner button on the back side of the tube 12. As the end cap 18 slides farther onto the tube 12, the straps 22 slide over the button 14 and its partner and, when the buttons align with the holes in the straps 22, bend inward towards the tube 12, and the button 14 and its partner on the back side protrude through the holes in the straps 22, just as the mesh screen 24 butts against the end of the tube 12. When the button 14 and its partner button on the opposite side of the tube 12 extend through the straps 22 on both sides of the tube 12, the end cap 18 is secured on the tube 12 until the straps 22 are bent outward and beyond the button 14 and its partner button, and the end cap 18 is slid off of the tube 12. For additional security, an elastic band or tape is wrapped circumferentially around the straps 22 and 23 to further secure the end caps 18 and 20 to the tube 12.

A tube used as part of the present invention should ideally be constructed of a synthetic resin tubing, such as polypropylene or polycarbonate which inherently have most all the characteristics required for the present invention. The tube should have high-temperature cleaning characteristics, which allow for technically advanced and conventional sanitation methods and which facilitate the use of conventional disinfectants for cleaning. The tube should also be smooth and seamless to prevent the contained animal from gnawing or clawing at its surface and to allow ease in removal of the animal. The tube is fluid impervious to prevent the passing of fluid through, or lodging of particles in, the tube walls. Ideally, the tube should be translucent so that viewing of the animal's location is possible. This translucency facilitates viewing of the animal during loading and unloading while not upsetting the animal with sudden changes in direct light anytime during the transit. The tube may be cleaned and reused hundreds of times, which enhances its economic attractiveness. These characteristics stated for the tube preferably apply to the end caps, but are not necessary.

Figure 2:
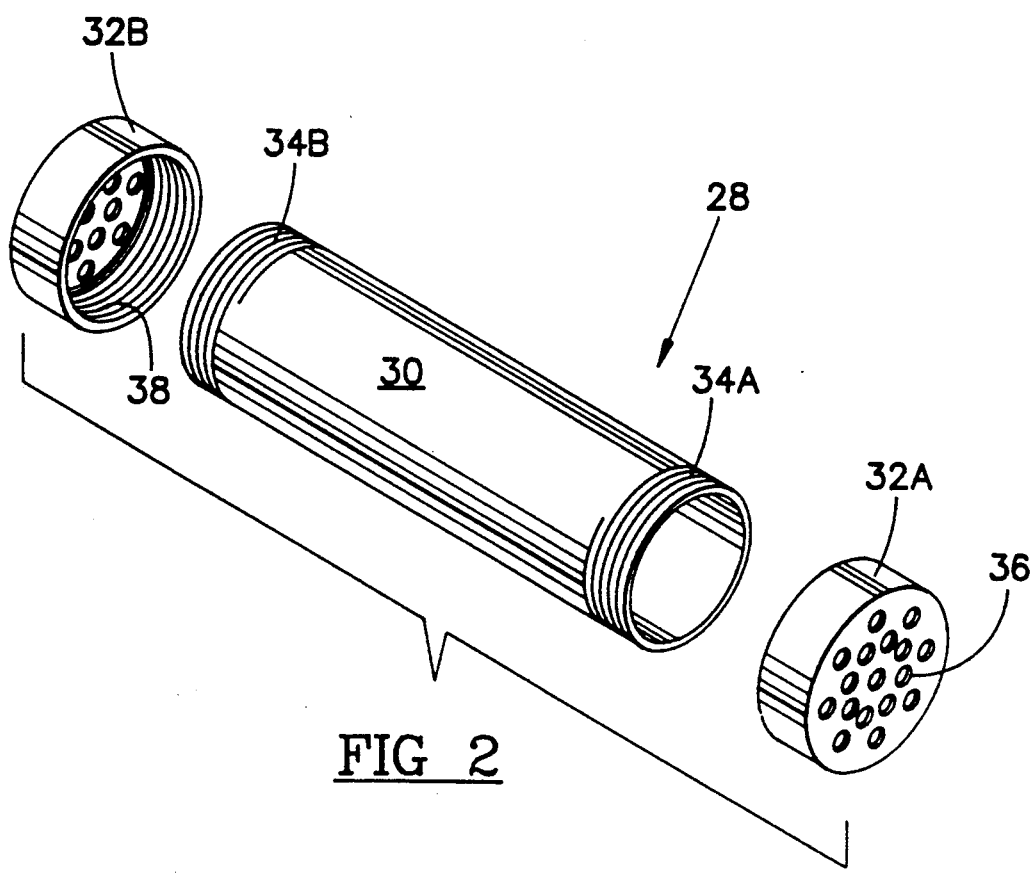
FIG. 2 is an exploded view in perspective illustrating an alternative embodiment of the present invention.

FIG. 2 illustrates an alternative embodiment of a container 28 which has a round cross-sectional tube 30 onto which two end caps 32A and 32B are attached.

The tube 30 has threads 34A and 34B formed in each end which facilitate attachment of the end caps 32A and 32B.

The end caps 32A and 32B are preferably made of the same material as the tube 30 and comprise a cylindrically shaped ring having much smaller length than the tube 30. This cylindrical ring has an end wall formed at one of its two ends extending across the ring and the wall is made of the same material as is used for the cylindrical ring. This end wall has small holes 36 formed in it to allow ventilation through the container 28 after assembly, just as the mesh screen 24 allows in FIG. 1.

The end caps 32A and 32B attach to the tube 30 by threads 34A and 34B formed on the exterior of the tube 30 and mating threads on the interior of the end caps 32A and 32B facilitating screwing attachment. FIG. 2 shows end cap 32B from the opposite side as end cap 32A. This view shows the threads 38 on the interior of the end cap 32B which correspond to and may be engaged with the threads 34B on the tube 30. End cap 32A has similar threads formed on its interior which correspond to and may be engaged with threads 34A.

Figure 10:
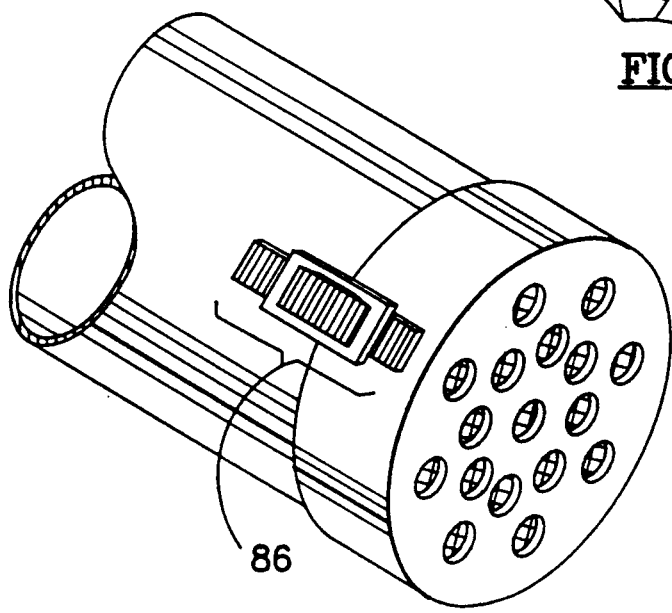
FIG. 10 is a view in perspective illustrating an alternative embodiment of a means for fastening an end cap to a tube.

Other structures for attaching an end cap to a tube are possible such as a buckle 86 as shown in FIG. 10, or tape, or slots and bayonets, or some other type of fastening structure formed onto the tube and the end caps.

Figure 3:
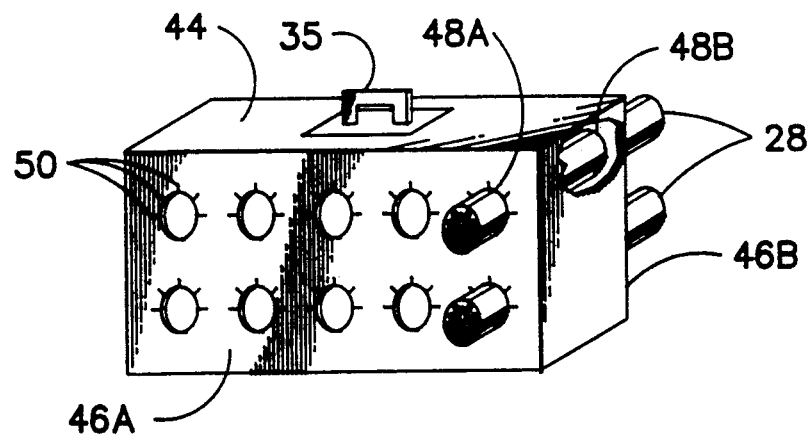
FIG. 3 is a view in perspective illustrating the preferred embodiment of a holder.

A transport container holder 44, illustrated in FIG. 3 and preferably constructed from corrugated paperboard or other pliable material, has two opposed panels 46A and 46B. These opposed panels 46A and 46B have holes 48A and 48B formed through them. These holes 48A and 48B permit the insertion of the container 28 of FIG. 2, but may be cut to the same shape as the cross-section of the tube 12 of FIG. 1 to allow the insertion of the container 10 of FIG. 1 or any other tube, and allow it to be held in frictional engagement with the opposed panels. In the preferred embodiment, there are additionally a series of cuts 50 formed around the upper half of the circumference of the holes 48A and 48B extending radially outward of the holes 48A and 48B. These cuts 50 are preferably approximately one-half to three-quarters of an inch in length and are located at approximately the 12, 3 and 9 o'clock positions. There are at least 2 additional cuts of equal length as the initial cuts made equidistant from and between the initial cuts. These cuts 50 enable the container 28, for example, to be inserted into the holes 48A and 48B when the diameter of the holes 48A and 48B is smaller than the diameter of the container 28. Cuts are not used around the lower half of the holes 48A and 48B since these would weaken the thin structural material of the holder 44 and the walls of the holder 44 around the container 28 could be slightly smashed by the weight of the container and its contents. Because the containers 28 protrude from the holder 44, the end caps are surrounded by ambient air to facilitate ventilation of the interior of the containers 28.

There are shoulders that are formed on the outside of containers by the end edges of the end caps which serve to prevent the containers from being knocked out of a holder. These shoulders seat against the outer edge of the holder panel if the container is pushed to one side of the holder, creating a greater inhibitor to a container falling out of a holder than just the friction fit described earlier.

The straps 22 and 23 formed on end caps 18 and 20 of FIG. 1 typically have about half of their length inside and about half outside of the holes in a holder panel when inserted into it. The panel hole edges around the end cap straps 22 and 23 provide a radial securing force on the straps 22 and 23, keeping the straps 22 and 23 seated firmly against the sides of the tube 12 and preventing them from being lifted over the buttons 14 and 16. This inwardly directed force on the straps 22 and 23 further secures the end caps 18 and 20 and prevents them from being accidentally removed from the tube 12 during transport.

The holder 44 is preferably constructed of 275 pound double wall corrugated paperboard of the type having 250-275 pound test or a 275-350 pound test C-Flute single wall fiberboard. The dimensions of the preferred embodiment of the holder 44 are approximately 31 inches in length, 18 inches in width and 22 inches in height. These dimensions vary, however, to suit the containers used and different transport methods. In the preferred embodiment of the holder as pictured in FIG. 3, the holder 44 is dimensioned so that all the containers 28 will fit inside the holder 44 to be returned empty to the original animal producer or vendor Approximately 2 inches of space is left between each hole and between the holes and the edge of the holder 44. This enhances the strength of the holder 44 as well as facilitating the placement of customized water packs between the containers when necessary. If some of these holes are unused or additional openings are formed in the holder, this spacing allows thorough air circulation around the portions of the containers in the holder to further reduce heat loads.

Figure 4:
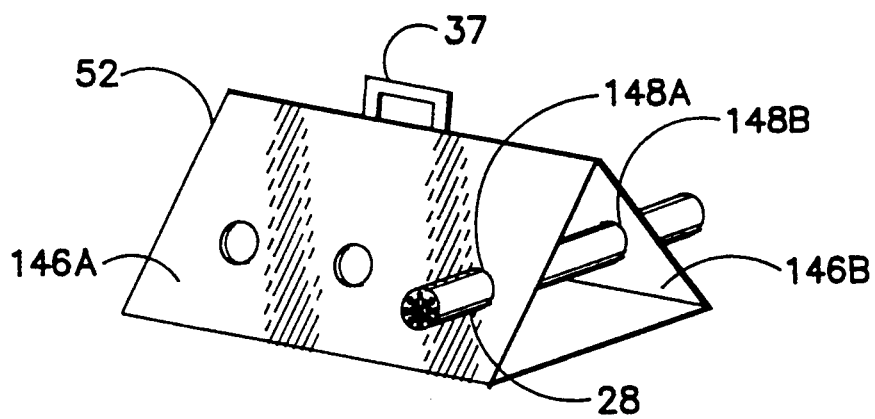
FIG. 4 is a view in perspective illustrating an alternative holder embodiment.

FIG. 4 shows another possible embodiment of a holder 52 having a triangular shape simplifying construction and providing inherent triangulational rigidity. The holes 148A and 148B are aligned on the opposed panels as those in FIG. 3 and similarly facilitate insertion and frictional engagement of, for example, the container 28. The holes 148A and 148B may also have cuts made around their circumference as in the preferred embodiment.

FIGS. 3 and 4 show hand grippable handles 35 and 37 formed on the top surface of the holders 44 and 52 respectively. These handles 35 and 37 facilitate insertion and gripping by the handler's hand and therefore improve the carrying characteristics of the holders 44 and 52.

Figure 5:
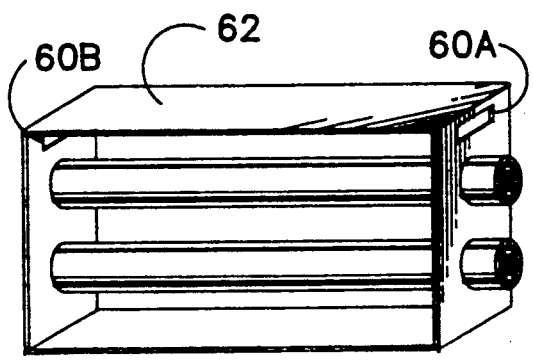
FIG. 5 is a view in perspective illustrating an alternative holder embodiment.

The handles 60A and 60B in FIG. 5 serve the same purpose as the hand grippable surfaces in FIGS. 3 and 4 and are similar hand grippable shapes. These handles 60A and 60B, however, are cut in the end of the holder 62 instead of formed on the top as in FIGS. 3 and 4. This may be done wherever structural rigidity allows. The holder 62 of FIG. 5 additionally has open sidewalls facilitating ventilation through the holder 62.

Figure 6:
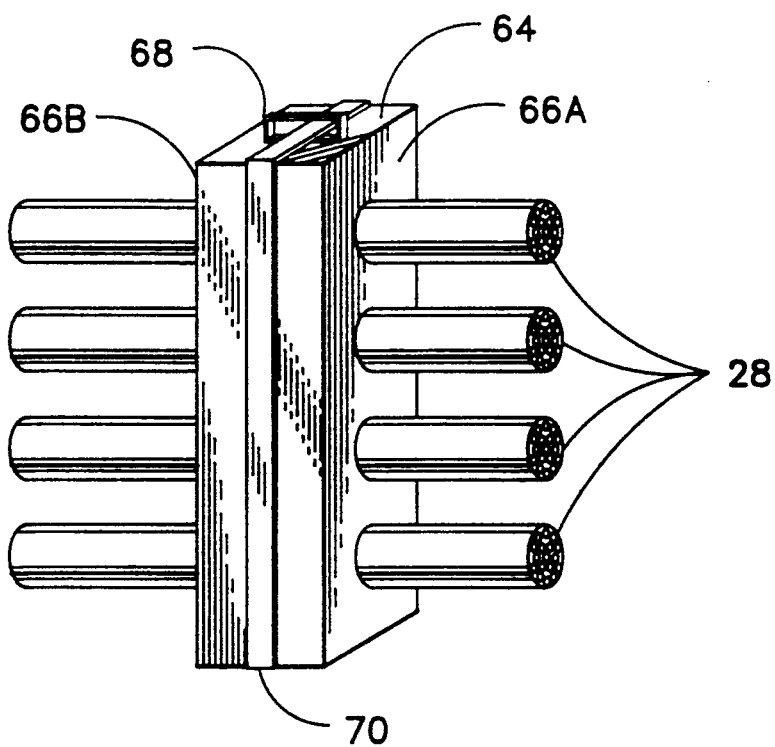
FIG. 6 is a view in perspective illustrating an alternative holder embodiment.

FIG. 6 shows a holder 64 having much smaller length than the containers 28. The panels 66A and 66B are much closer to each other than in previous embodiments, exposing more of the external surface of the containers 28 so that air circulation around the containers 28 is enhanced. This air circulation around the containers 28 tends to keep the temperature within the containers 28 equal to the environmental temperature.

The hand grippable surface 68 formed on the holder 64 in FIG. 6 comprises a strap 70 attached around the holder 64 onto which a rectangular handle 68 is attached. The rectangular handle 68 permits the insertion of the handler's hand for lifting and carrying the holder 64.

Figure 7:
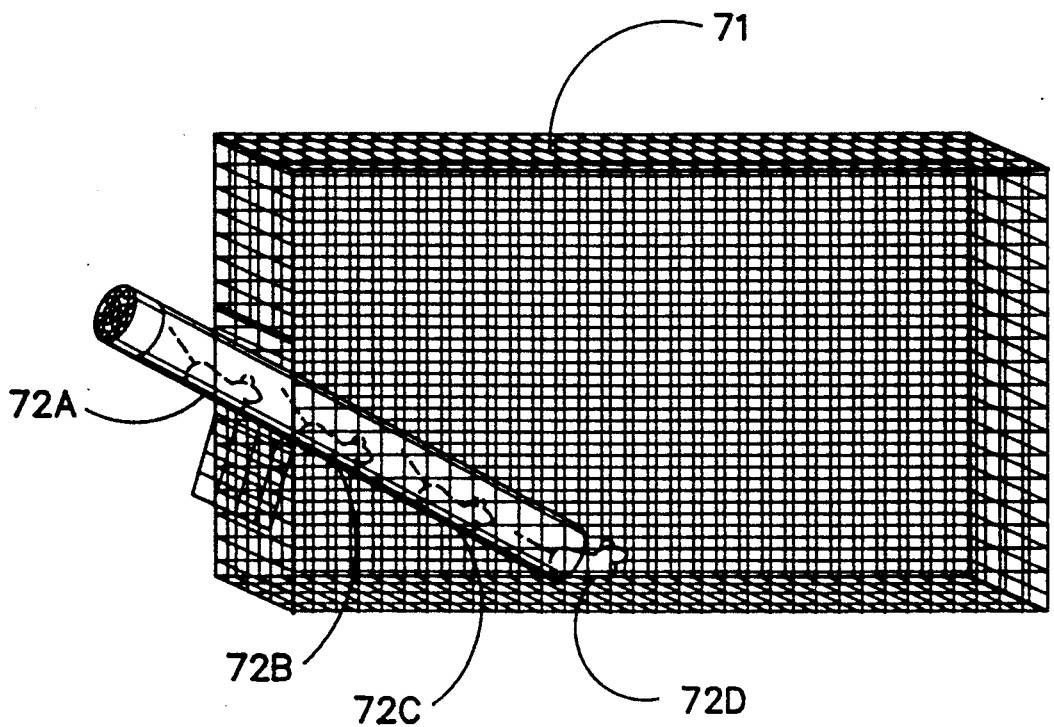
FIG. 7 is a view in perspective illustrating the use of a container in removing animals.

The operation of the container 28 is as follows. Referring to FIGS. 2, 3, and 7, the end cap 32A is screwed onto the end of the tube 30 and the necessary contents and animal(s) are placed into the tube 30. The end cap 32B is placed into contact with the tube 30 and twisted allowing the threads 38 on the end cap 32B to matingly engage with the threads 34B on the tube 30. This twisting of the end cap 32B is continued until the end cap 32B is completely seated against the tube 30. An identical process previously occurred for end cap 32A. After the end cap 32A and 32B are screwed onto the tube 30, they may be further fastened with wide tape over the tube 30 and the end caps 32A and 32B to insure the impossibility of escape by the contained animal.

The assembled container is inserted into a holder either along with other containers or by itself. As the container is inserted into the holder 44, for example, from FIG. 3, the cuts 50 in holes 48A and 48B allow the diameter of the holes 48A and 48B in the panels 46A and 46B to increase to the diameter of the container and apply a force against the external surface of the tube. This force maintains the position of the container in the holes 48A and 48B by friction so that rollover and shifting of the container are eliminated. In the preferred embodiment, the container extends approximately four inches outward of each panel 46A and 46B allowing proper ventilation around the exterior of the container. This air circulation around the container maintains the temperature of the air within the container to be approximately that of the environment.

The holder 44 is then shipped to the buyer who after removing the tube from the holder removes one of the end caps. The buyer then, as shown in FIG. 7, gently tilts the tube into the cage 71, sliding the animals 72A, 72B, 72C, and 72D gently down the smooth interior of the tube, into the cage 71. No handling of the animals is necessary when animals are packaged in a quantity desired for each cage. The translucency of the tube permits viewing of the location of the contained animals 72A 72B, and 72C so that during removal, the animals are sure to all be removed. The end cap is then reattached onto the tube, the container is inserted into the holder and the entire assembly is shipped back to the supplier.

Because the end walls of the end caps meet at 90° angles with the tube when completely attached, there are no locations where the contained animal may gnaw or insert its claws to wear away at the container and possibly escape. Because of the secure fastening means on the outside of the container 10 of FIG. 1, and the tight fitting threads which are used to attach the end caps 32A and 32B to the tube 30, there are no small crevices through which smaller animals may escape. Additionally, the bedding within the container and any animal waste cannot escape the system of the container.

Figure 8:
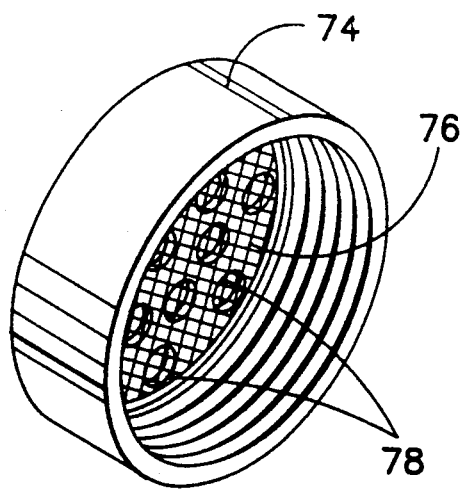
FIG. 8 is a view in perspective illustrating the inside of an end cap.

An alternative embodiment of an end cap 74, illustrated in FIG. 8, shows the placement of mesh screen 76 within the end cap 74 to prevent gnawing by small animals on the material around the drilled holes 78 which may be formed of plastic or a relatively soft material. If needed, stainless steel or aluminum mesh may be used to prevent gnawing by rodents or other species. The mesh 76 is preferably glued or welded to the closed end of the end cap 74 on the interior of the end cap 74, providing all mesh 76 perpendicular to the tube after assembly.

Figure 9:
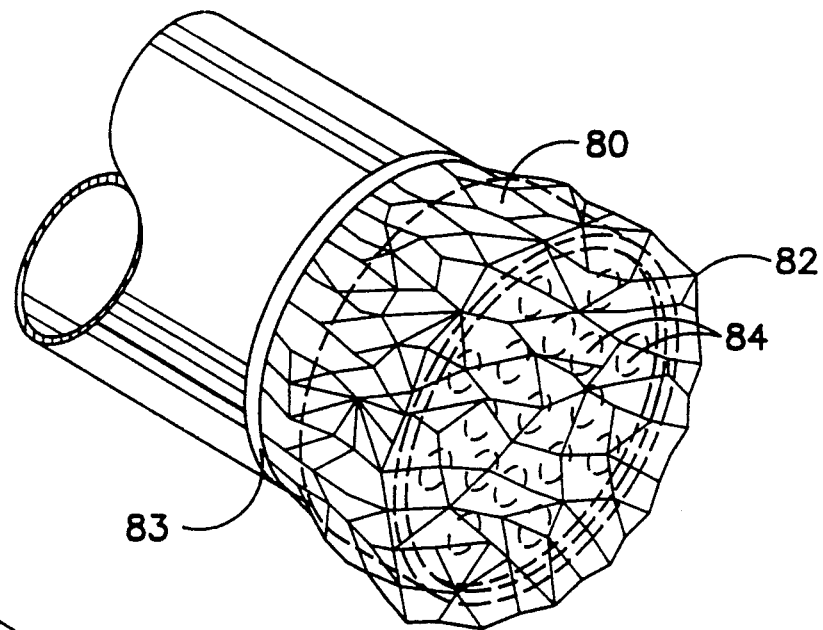
FIG. 9 is a view in perspective illustrating filter paper attached to an end cap.

FIG. 9 shows the attachment of filter paper 82 around the exterior of the end cap 80. This is done so that air which circulates through the container from the outside will be filtered. This is especially desirable for Specific Pathogen Free (SPF) animals. The filter paper 82 is ideally placed over the end caps 80 and folded back along the side walls of the tube. An elastic band 83 encircles the skirt of the filter paper and draws the filter paper 82 tightly around the tube giving it a "shower cap" fit and appearance. The filter paper may be cut in a circular disk shape and glued on the outside of the end cap 80 over the holes 84 or preferred mesh lattice 24 (from FIG. 1). These attachments of filter paper 82 allow an easy change of the porosity of the filter paper 82 by merely removing it and inserting another piece of filter paper of desired porosity. Alternatively, the filter paper 82 can be held in an annular groove formed on the interior of the end cap outwardly of the perforated wall of the cap and/or can be held by retainer bars extending radially across the end cap.

Figure 11:
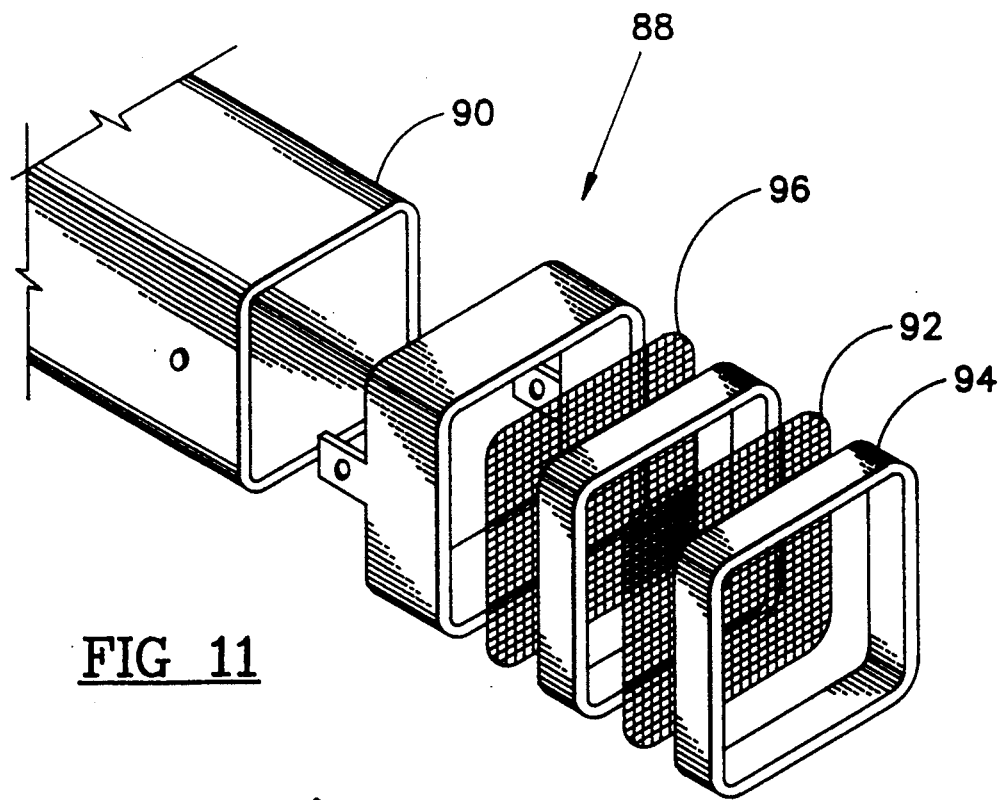
FIG. 11 is an exploded view in perspective illustrating an alternative end cap embodiment.

FIG. 11 is an exploded view illustrating a further embodiment of an end cap 88. The end cap 88 is made up of a structure similar to the preferred end cap 18 illustrated in FIG. 1, which is shaped similarly to the tube over which it slides and has a mesh screen rigidly mounted approximately mid-way between its two ends. The end cap 88, however, additionally has a secondary screen 92 and spacer 94 added. After the end cap 88 is assembled, there is an air space between the secondary screen 92 and primary screen 96. This air space serves to prevent the handler of the container from being bitten if the handler places his hand over the end cap 88 once the animal is inside. It is possible, for example in the embodiment of FIG. 1, that an animal, such as a rat, would place its claws through the mesh 24, allowing a handler whose hand is clasped over the end of the container 10 to be clawed by the animal within. The end cap 88 of FIG. 11 would be used to further separate the handler from a dangerous animal's natural weaponry not only by the extra distance, but also by a secondary barrier which would have to be penetrated for injury to occur. This end cap 88 would be used in the case where a particularly wild, vicious or venomous specimen was contained within the tube 90 or to protect a certain specimen if the tendency is for that specimen to pierce the perforated barrier with a digit and extend it to a point where it could be injured.

Figure 12:
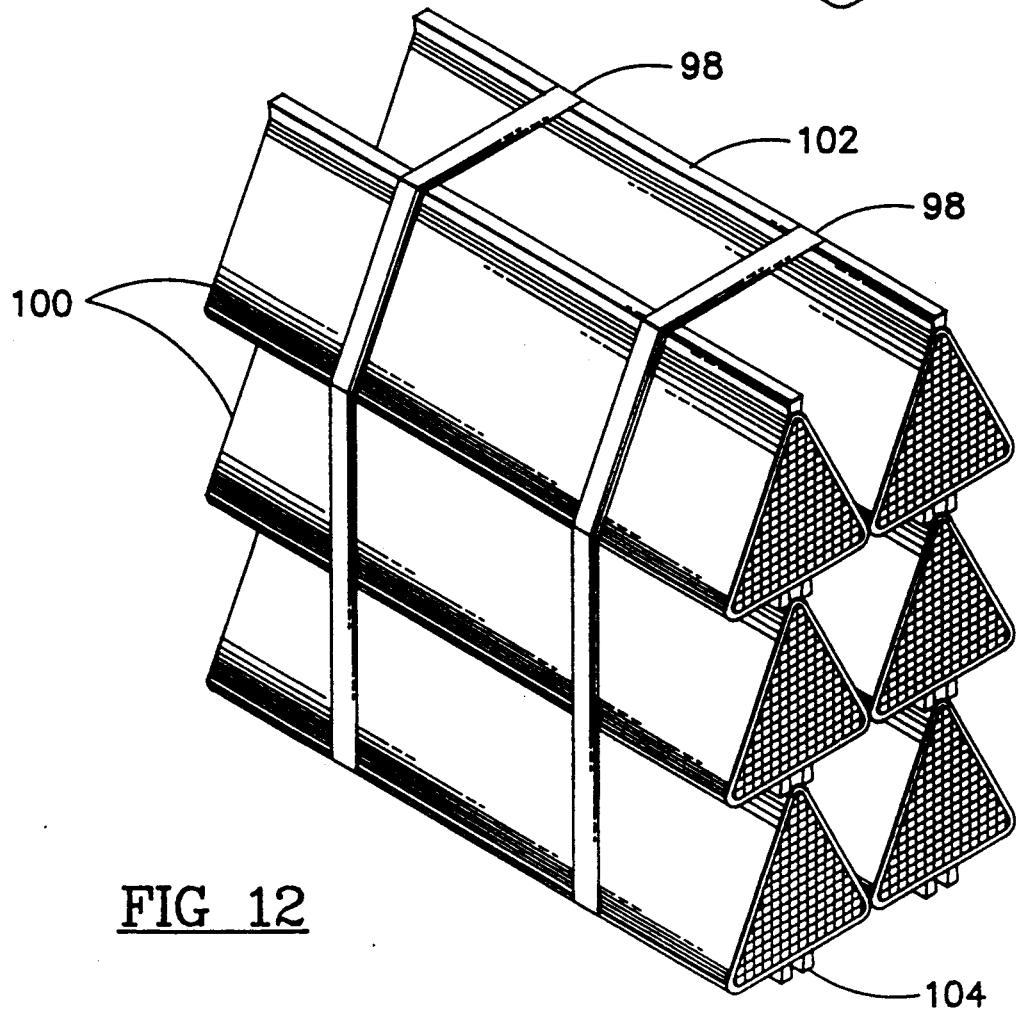
FIG. 12 is a view in perspective illustrating an alternative container holding means.

FIG. 12 illustrates a means for containing a plurality of containers. This means includes a series of straps 98 encircling a stack of containers 100 and binding them together. The containers 100 have a separating means made up of the tongue 102 and groove 104 means illustrated in FIG. 12. The tongue 102 and groove 104 means may have an interlocking dovetail shape as shown to provide attachment of the containers 100 to each other or, may be non-interlocking spacing blocks placed between each container 100 to merely separate each container from the one stacked above it or next to it. Other interlocking devices may be attached to end caps as another form of strengthening the stack of containers and providing the proper spacing. This separation aids in air circulation around the containers 100 and the separating means keep the "pile" of containers 100 upright and of a constant shape.

Figure 13:
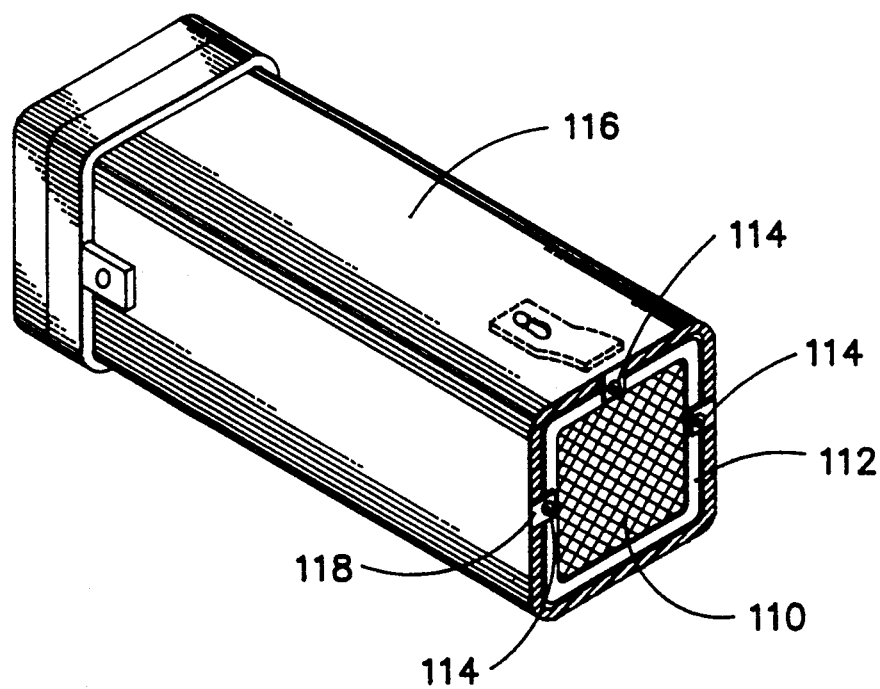
FIG. 13 is a view in perspective and in section illustrating an alternative, additional feature of the present invention.

FIG. 13 is a view in perspective and section and illustrates the addition of a perforated mesh lattice divider within the container in order to compartmentalize the container while still allowing for proper ventilation. This air permeable animal barrier allows animals to be transported in each of the compartments while maintaining their separation. Thus, for example, males and females can be separated or males which might otherwise fight can be separated. This is particularly valuable with some of the larger species of animals or with more mature male animals that have a tendency to fight when group housed. While a variety of structures would be possible, the barrier 110 may be formed with a suitably rigid frame 112 which is mounted by fasteners 114, such as self-tapping screws, so that it is contained within the tube 116. The fasteners may each pass through one of a plurality of mounting tabs 118 which are secured to the interior wall of the tube 116. For example, the tabs may be stainless tabs with a central hole which are heat bonded to the interior wall.

While certain preferred embodiments of the present invention have been disclosed in detail, it is to be understood that various modifications may be adopted without departing from the spirit of the invention or scope of the following claims.

We claim:

1. An animal transport container comprising a smooth, seamless, fluid impervious tube and a removably fastened air permeable end cap at each end of the tube, each end cap having an air permeable area extending over a major portion of the end cap, the end caps being sufficiently non-destructible and non-deflectable so as to be animal impenetrable, and having no edges which are accessible to and chewable by the contained animal so as to be indestructible by the contained animal, the end caps also having sufficient air permeability to maintain the animal alive for the safe and economical transport of animals.

2. The container in accordance with claim 1 wherein the cross-sectional shape of the tube is a polygon having at least three sides.

3. The container in accordance with claim 2 wherein the cross-sectional shape of the tube is rectangular with rounded corners.

4. The container in accordance with claim 1 wherein the cross-sectional shape of the tube is circular.

5. The container in accordance with claim 4 wherein the end caps are fastened to the tube by screw threads formed on the interior of the end caps which matingly engage with corresponding screw threads on the exterior of the tube facilitating fastening by twisting the end caps onto the tube.

6. The container according to claim 1 or 2 or 3 or 4 wherein the end caps are fastened to the tube by cooperating fastening means formed on the tube and the end caps.

7. The container in accordance with claim 6 wherein the fastening means comprises a pair of straps extending from the end cap toward the tube, each strap having a hole formed through it, and a pair of buttons formed on the exterior of the tube and corresponding to the holes in the straps, for inserting the buttons through the holes in the straps.

8. The container in accordance with claim 1 or 2 or 3 or 4 wherein the end cap comprises a second tube whose length is less than the first tube and whose cross-sectional shape is identical to that of the first tube, having one end open and the opposite closed, the closed end having air permeable holes formed through it.

9. The container in accordance with claim 1 or 2 or 3 or 4 wherein each end cap further comprises at least one mesh screen lattice which is indestructible by the contained animal and extends across the interior of the end cap for allowing ventilation through the container.

10. The container in accordance with claim 9 wherein each end cap comprises at least 2 mesh screen lattices spaced apart from each other forming an air space between the mesh screens for providing further separation of a contained animal from a handler.

11. The container in accordance with claim 1 or 2 or 3 or 4 wherein the container further comprises a handle removably fastened to the tube for ease in handling the container.

12. The container in accordance with claim 1 or 2 or 3 or 4 wherein the container further comprises at least one spacer block on the outer surface of the container.

13. The container in accordance with claim 12 wherein said at least one spacer block is rigidly attached to at least one side of the container.

14. The container in accordance with claim 13 wherein said at least one spacer block interlocks with at least one spacer block on another container.

15. The container in accordance with claim 1 wherein the tube has substantially greater length than the contained animal for containing a plurality of animals within the same container.

16. The container in accordance with claim 1 wherein the tube is constructed from lightweight, temperature resistant, translucent, synthetic resin.

17. The container according to claim 1 wherein the end caps further comprise a filtration material of selected pore size securely covering the end caps, filtering air which passes through the filter paper.

18. The container in accordance with claim 17 wherein the filter paper comprises a generally circular dish of filter paper with an elastic band attached around its outer circumference, the elastic band tightly holding the filter paper onto the container.

19. The container in accordance with claim 1 wherein an air permeable animal barrier is interposed between the ends and attached to the interior of the tube for subdividing the tube into a plurality of compartments.

20. An animal transport apparatus comprising:
(a) an animal transport container comprising a smooth, seamless, fluid impervious tube and a removably fastened, air permeable end cap which is indestructible by the contained animal at each end of the tube for the safe and economical transport of animals; and
(b) a holder comprising at least two opposed panels in which at least one aligned hole pair is formed, one hole in each panel smaller than the tube, for the insertion and frictional engagement of the animal transport container.

21. The holder according to claim 20 wherein at least one hole is formed in the panels to provide ventilation of the interior of the holder.

22. The holder in accordance with claim 20 wherein at least one radial cut is formed around the circumference of the holes.

23. The holder in accordance with claim 22 wherein a plurality of radial cuts are formed around the circumference of the holes.

24. The holder in accordance with claim 23 wherein the plurality of radial cuts is formed around only the top half of the holes.

25. The holder according to claim 20 wherein a hand grippable surface is formed on the holder for ease in handling the holder.

26. The holder in accordance with claim 20 wherein a container inserted in the holder extends beyond the panels on either side facilitating air circulation around the container for maintaining ambient temperature within the container.

27. The holder in accordance with claim 20 wherein a plurality of aligned hole pairs are formed.

28. The holder in accordance with claim 27 wherein each aligned hole pair is spaced relative to other hole pairs facilitating air circulation within the holder between containers inserted in the hole pairs for maintaining ambient temperatures within the containers.

29. The holder in accordance with claim 20 wherein the holder is formed into a receptacle having a length longer than the length of the containers and a width wider than the width of the containers so that the empty containers may be contained entirely within the holder for transport.

30. A method for transporting laboratory animals comprising:
(a) providing a container comprising a smooth, seamless, fluid impervious tube and a removably fastened air permeable end cap, at each end of the tube, each end cap having an air permeable area extending over a major portion of the end cap, the end caps being sufficiently non-destructible and non-deflectable so as to be animal impenetrable, and having no edges which are accessible to and chewable by the contained animal so as to be indestructible by the contained animal, the end caps also having sufficient air permeability to maintain the animal alive for the safe and economical transport of animals;
(b) removing an end cap of said container;
(c) inserting at least one animal in the container;
(d) replacing the removed end cap;
(e) shipping the container to a destination;
(f) removing an end cap; and
(g) inclining the container to remove the animal.

* * * * *